April 12, 1960 W. N. GILES 2,932,279
SHELTER FOR SMALL ANIMALS
Filed July 25, 1958 2 Sheets-Sheet 1

INVENTOR.
WILLIAM N. GILES
BY
McMorrow, Berman & Davidson
ATTORNEYS

April 12, 1960 — W. N. GILES — 2,932,279
SHELTER FOR SMALL ANIMALS
Filed July 25, 1958 — 2 Sheets-Sheet 2
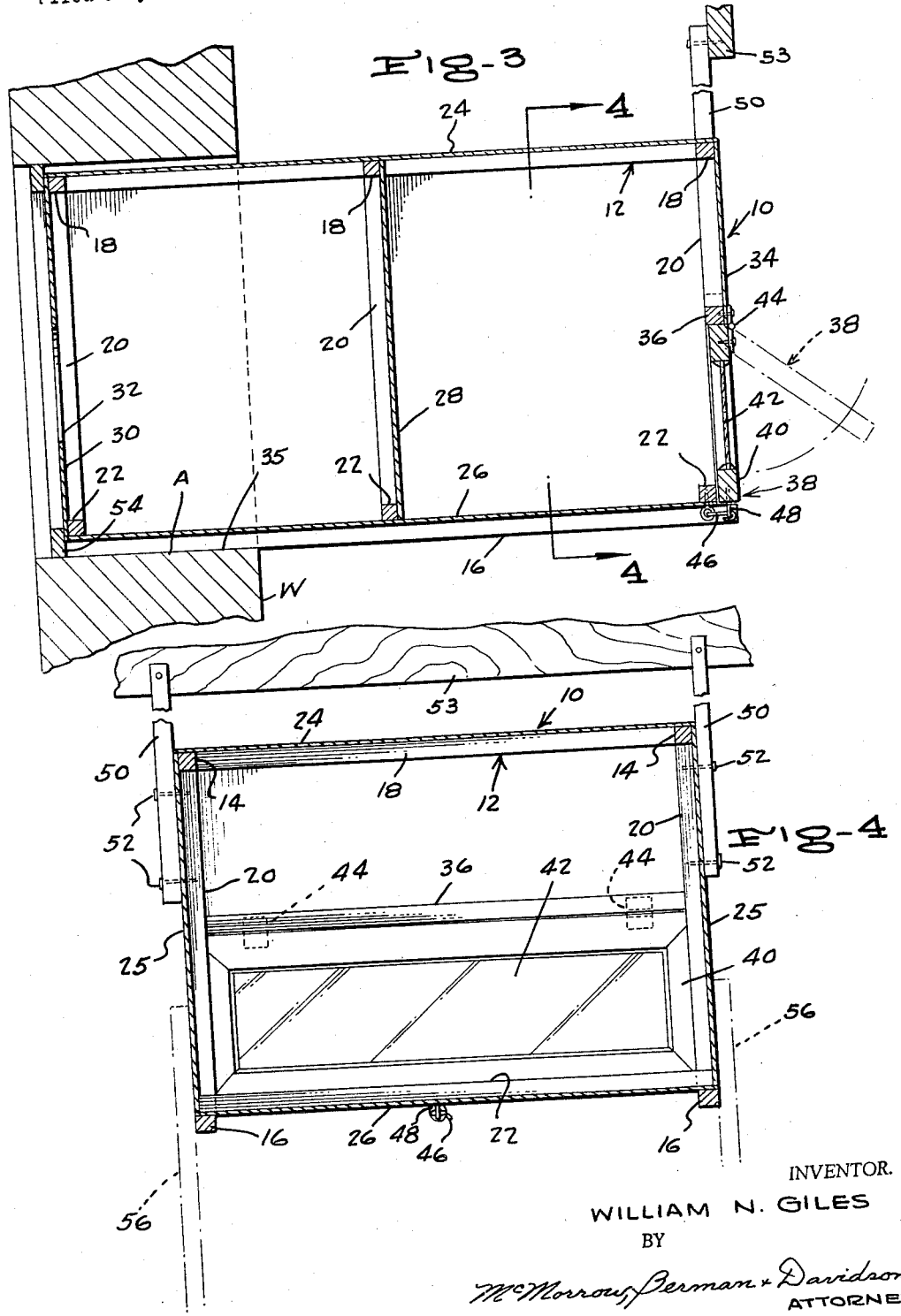
INVENTOR.
WILLIAM N. GILES
BY McMorrow, Berman & Davidson
ATTORNEYS

United States Patent Office 2,932,279
Patented Apr. 12, 1960

2,932,279

SHELTER FOR SMALL ANIMALS

William N. Giles, Roanoke, Va.

Application April 25, 1958, Serial No. 750,947

3 Claims. (Cl. 119—15)

This invention relates to shelters, enclosures, or other protective structures for cats, dogs, etc.

The main object of the present invention is to provide a shelter of the type stated which will shelter cats or other small animals, within the house of the owner of the animal, while at the same time allowing the animal access to the outside without having to be let in or out.

Many persons enjoy having small animals, such as cats, as pets. Nevertheless, such enjoyment often does not extend to a desire to admit the animal to the interior of the house. Yet, the owner may be somewhat disturbed by reason of the fact that the cat must remain outside, fully exposed to the elements.

The present invention, as one important object thereof, is designed to provide maximum shelter and comfort for the animal, while at the same time eliminating the annoying inconvenience wherein the owner must open and close doors for the animal while letting the animal in or out. It is a further object, in this regard, to permit the animal to have the comfort and warmth that results from the animal being indoors, while at the same time actually preventing the animal from having the complete freedom of the household.

In carrying out these desirable objects, the invention includes a box-like enclosure, which is partitioned into an outer, entrance chamber and an inner, rear chamber. The entrance chamber has a small aperture opening directly upon the exterior of the owner's house, so that free passage of the animal into or out of the shelter is permitted. The partition has a similar opening, to permit free passage between the entrance and rear compartments. The rear comportment is disposed well in from the outer wall of the building, so as to provide the animal maximum warmth. Said rear compartment has a door, which can be opened for the purpose of permitting the animal to enter the house of the owner. Said door, however, can be normally latched.

The device, in this connection, is designed for being mounted directly within a window, preferably a basement window, with substantially the full length of the device being projected interiorly of the building structure from said window, so as to give the animal maximum warmth.

Another object is to provide a shelter of the character described that can be swiftly and easily mounted in a window, without requirement of special skills.

Still another object is to so form the device that it can be abutted directly across the window frame, without requiring modification and redesign of said frame.

Still another object is to so form the device as to permit the free passage of the pet into and out of the same, while denying passage to larger, predatory animals.

Other objects will appear from the following description, the claims appended thereto, and from the annexed drawings, in which like reference characters designate like parts throughout the several views, and wherein:

Figure 3 is a longitudinal sectional view substantially on line 3—3 of Figure 1, on a scale increased slightly above that of Figure 1, the door being shown in closed and open positions in full and dotted lines respectively; and Figure 4 is a transverse sectional view on the same scale as Figure 3, taken on line 4—4 of Figure 3.

Figure 1:
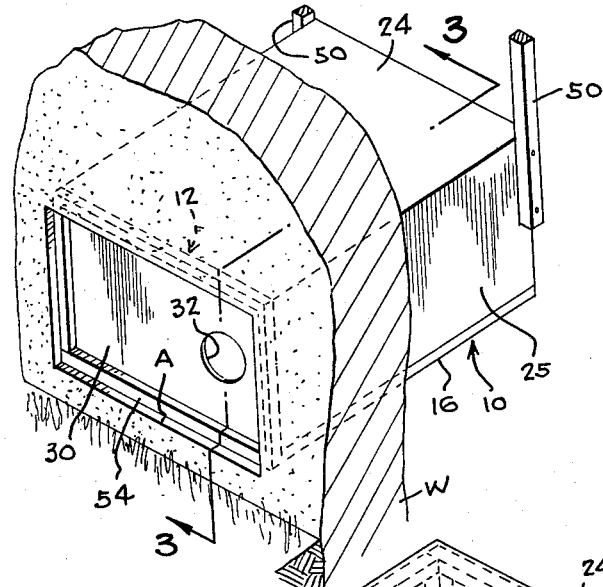
Figure 1 is a perspective view of a shelter according to the present invention, mounted in a wall, the wall being shown fragmentarily.
Figure 2:
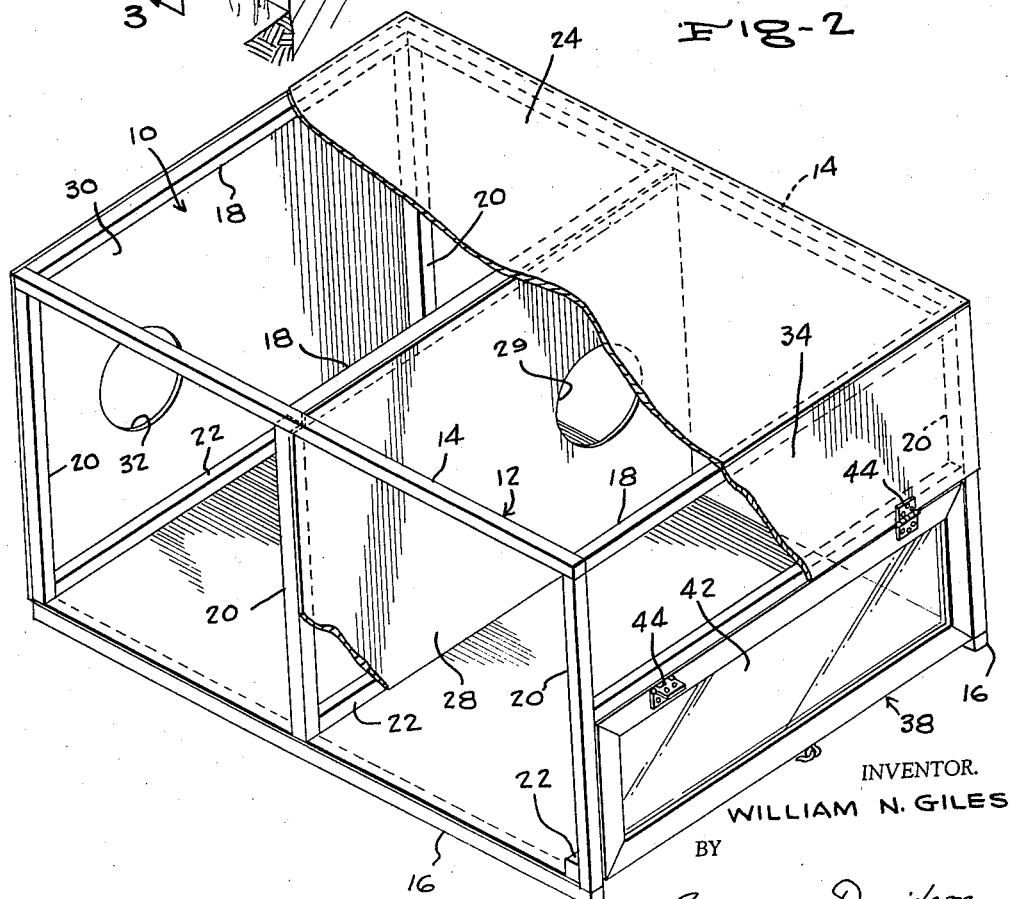
Figure 2 is an enlarged perspective view of the device as seen from the rear, portions of the walls of the device being broken away.

Referring to the drawings in detail, generally designated at 10 is the shelter comprising the present invention. This is adapted to be mounted in the window aperture A of a building wall W. Preferably, the device is mounted in a basement window as shown. However, any window which will be readily accessible to the animal from outside the house is suitable and even if the device does not fit the window with suitable snugness, the installation can nevertheless be effected easily. This is by reason of the fact that a window board, mounted against the window frame, can be used, said board having an opening which will correspond to the overall cross sectional area of the device, the device being mounted against said opening.

In any event, in the illustrated example, the shelter 10 includes a frame generally designated 12. Frame 12 includes upper longitudinal members 14 and lower longitudinal members 16. Fixedly connected between the upper members are cross members 18. There are three of these, one at the front, one at the rear, and one intermediate the opposite ends of the device (Figure 3).

The frame further includes vertical side members 20, disposed at the front, back, and at the intermediate portion of the frame. Horizontal, transverse lower cross members 22 are secured to the several members 20.

It will thus be seen that there is provided a rectangular frame, and secured to the frame members are a top wall 24, side walls 25, and a bottom wall 26. This provides a suitably braced enclosure. At 28 there is illustrated a transverse, vertical partition medially located between the opposite end walls 30 and 34. The front or outer end wall 30 has, adjacent one side thereof, a relatively small diameter, circular opening 32, whereby the animal may enter or leave the shelter. An opening 29 of corresponding diameter is formed in the partition 28. This, however, is offset transversely of the shelter from the opening 32, that is, the openings are not aligned longitudinally of the shelter. Opening 29 is disposed adjacent the opposite side of the shelter from the side near which opening 32 is located. This reduces drafts, and provides greater protection against the elements when the animal is disposed in the inner compartment, between partition 28 and inner wall 34.

As will be noted, the entire frame 12 is enclosed by the several walls, with the exception of the bottom frame members 16, which are adapted to be disposed upon the bottom ledge or surface 35 (Figure 3) of the window aperture A.

Designated at 36 is a transverse cross brace at the rear of the shelter, said cross brace comprising a part of the frame 12.

An access door generally designated at 38 comprises a part of the rear wall, and includes a rectangular frame 40 in which may be mounted a transparent panel 42. The door is hinged at 44 on the brace 36, and a hook and eye 46, 48 respectively, of the type conventionally employed in latching screen doors, storm windows, etc., are carried by the frame and door respectively. The door is thus latched in closed position, from within the basement or other room into which the shelter projects.

Secured to the opposite sides of the shelter, at the rear end thereof, are upwardly projecting hanger rods 50, connected by nails 52 to the opposite sides of the structure. Rods or bars 50, at their upper ends, are nailed to a ceiling joist 53, or other overhead support.

In mounting the device, the far end thereof is abutted against a conventional frame 54 of the basement window, as shown in Figure 3. The device could if desired be secured fixedly to said frame. The hanger rods 50 are secured to the ceiling joist 53 as shown in Figures 3 and 4. No further installation is necessary. The animal can enter or leave the shelter from the outside of the house, without disturbing the owner. When the animal enters the shelter, it moves to the rear compartment, for maximum warmth and protection against the elements.

If a ceiling joist or other overhead support is not provided, then legs 56 can be secured to the opposite sides of the device. As shown in dotted lines in Figure 4, said legs would extend downwardly to the floor, not shown.

The advantages and manner of use of the device would appear obvious. Whenever it is desired to admit the animal to the house, the door 38 can be opened. Alternatively, said door can be opened so that the owner can place food in the rear compartment of the shelter.

It will be understood that the particular dimensions of the device are not critical to the invention, and it is not desired to limit the protection by specifying dimensions, since these can vary according to the desires of the particular manufacturer. The same is true of the materials that could be applied.

It will be understood that the connections employed are such as to provide maximum weather-stripping characteristics in the device, and any additonal weather-stripping could of course be employed, according to the desires of the particular manufacturer or user.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a shelter for small animals the combination, with a building window including a window frame bounding a window opening, of an enclosure having its length projecting horizontally inwardly from the window within the building, said enclosure having parallel, vertical, outer and inner end walls, the outer end wall being mounted against the window frame and being formed with an entranceway disposed wholly within the area of said window opening; a transverse partition disposed approximately midway between the end walls in parallel relation thereto so as to divide the enclosure into outer and inner chambers of approximately equal size, said partition having an opening communicating between the chambers; support means extending outwardly from said enclosure adjacent the inner end wall for connection to an adjacent portion of the building; and an access door hingedly suspended from the end wall and extending fully from side-to-side of the enclosure, said door having a transparent area extending across substantially the full width of the enclosure so as to provide visibility of the entire inner chamber from within the building, and visual inspection of the outer chamber through the partition opening.

2. In a shelter for small animals, the combination, with a building window including a rectangular, vertical window frame bounding a window opening, of a rectangular enclosure appreciably longer in a direction taken inwardly of the building from the frame than in a direction taken transversely of the window frame, said enclosure having its length projecting horizontally inwardly from the window within the building, the enclosure having parallel, vertical, outer and inner end walls, the outer end wall being mounted against said frame in direct contact therewith over the full periphery of the frame, and being formed with an entranceway disposed fully within the area of said window opening; a transverse, vertical partition disposed approximately midway between the end walls in parallel relation thereto so as to divide the enclosure into outer and inner chambers of approximately equal size, said partition having an opening communicating between the chambers; support means extending outwardly from said enclosure adjacent the inner end wall for connection to an adjacent portion of the building; and an access door hingedly suspended from the end wall and extending fully from side-to-side of the enclosure, said door having a transparent area extending across substantially the full width of the enclosure so as to provide visibility of the entire inner chamber from within the building, and visual inspection of the outer chamber through the partition opening.

3. In a shelter for small animals the combination, with a building window including a rectangular, vertical window frame bounding a window opening, of a rectangular enclosure appreciably longer in a direction taken inwardly of the building from the frame than in a direction taken transversely of the frame, said enclosure having its length projecting horizontally inwardly from the window within the building, said enclosure having parallel, vertical, outer and inner end walls, the enclosure including a support frame formed with upper and lower, parallel, longitudinal members, front, intermediate, and rear upper cross members connected between the upper longitudinal members, and lower front, intermediate, and rear cross members connected between the lower longitudinal members, the outer end wall being secured to the front cross members and the inner end wall being secured to at least the upper rear cross member, said enclosure further including top, side, and bottom walls secured to and coextensive in length with the several longitudinal members, the outer end wall being mounted against said window frame in direct contact therewith over the full periphery of the window frame, and being formed with an entranceway disposed wholly within the area of said window opening; a transverse, vertical partition secured to the intermediate cross members and disposed approximately midway between the respective end walls in parallel relation thereto so as to divide the enclosure into outer and inner chambers of approximately equal size, said partition having an opening communicating between the chambers; support means extending outwardly from said enclosure adjacent the inner end wall for connection to an adjacent portion of the building; and an access door hingedly suspended from the end wall and extending fully from side-to-side of the enclosure, said door, in the closed position thereof, abutting the lower rear cross member, the door having a transparent area extending across substantially the full width of the enclosure so as to provide visibility of the entire inner chamber from within the building, and visual inspection of the outer chamber through the partition opening.

References Cited in the file of this patent

UNITED STATES PATENTS

| | | |
|---|---|---|
| 1,532,486 | Harrington | Apr. 7, 1925 |
| 2,764,128 | Howley et al. | Sept. 25, 1956 |